(12) United States Patent
Chen et al.

(10) Patent No.: US 10,205,520 B2
(45) Date of Patent: Feb. 12, 2019

(54) METHOD AND DEVICE FOR MEASURING OPTICAL SIGNAL-TO-NOISE RATIO

(71) Applicant: Accelink Technologies Co., Ltd., Wuhan (CN)

(72) Inventors: Shuang Chen, Wuhan (CN); Liping Sun, Wuhan (CN); Qianggao Hu, Wuhan (CN); Yan Chen, Wuhan (CN); Hui Xie, Wuhan (CN); Qingyan Yue, Wuhan (CN); Fei Liang, Wuhan (CN); Yin Zhang, Wuhan (CN); Hehui Wu, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/667,794

(22) Filed: Aug. 3, 2017

(65) Prior Publication Data

US 2017/0359121 A1     Dec. 14, 2017

Related U.S. Application Data

(63) Continuation-in-part of application No. 14/780,378, filed as application No. PCT/CN2013/084670 on Sep. 30, 2013.

(30) Foreign Application Priority Data

Mar. 26, 2013   (CN) .......................... 2013 1 0098130

(51) Int. Cl.
*H04B 10/079*     (2013.01)

(52) U.S. Cl.
CPC . *H04B 10/07953* (2013.01); *H04B 10/07955* (2013.01)

(58) Field of Classification Search
CPC ...................... H04B 10/0775; H04B 10/07953
See application file for complete search history.

(56) References Cited

U.S. PATENT DOCUMENTS 5,894,362 A  *  4/1999  Onaka .................. H04B 10/077
                                                       398/34
6,094,514 A       7/2000  Kim
                          (Continued)

FOREIGN PATENT DOCUMENTS

CN        101119174 A    2/2008
CN        102687426 A    9/2012
                 (Continued)

OTHER PUBLICATIONS

International Search Report for Application No. PCT/CN2013/084670 dated Jan. 9, 2014.

*Primary Examiner* — Casey Kretzer
(74) *Attorney, Agent, or Firm* — Lerner, David, Littenberg, Krumholz & Mentlik, LLP (57) ABSTRACT

Embodiments of the present invention relate to method and device for measuring optical signal-to-noise ratio (OSNR). A method for measuring an OSNR of a signal of interest may comprise: obtaining spectrum of the signal of interest, the spectrum including power spectrum density distribution of the signal of interest in a channel bandwidth B; obtaining spectrum of a comparative signal that has the same spectrum characteristics as but different OSNR than the signal of interest, the spectrum including power spectrum density distribution of the comparative signal in the channel bandwidth B; and calculating the OSNR of the signal of interest by using the spectrum of the signal of interest and the spectrum of a comparative signal.

20 Claims, 3 Drawing Sheets

(56) References Cited

U.S. PATENT DOCUMENTS

| | | |
|---|---|---|
| 7,149,407 B1 | 12/2006 | Doerr et al. |
| 2005/0089027 A1 | 4/2005 | Colton |
| 2006/0285846 A1* | 12/2006 | Uekama ............ H04B 10/0775 398/30 |
| 2010/0129074 A1 | 5/2010 | Gariepy et al. |
| 2012/0106951 A1 | 5/2012 | Wan et al. |
| 2012/0114330 A1 | 5/2012 | Bruno et al. |
| 2012/0155861 A1 | 6/2012 | Liu |
| 2012/0201533 A1 | 8/2012 | Gariepy et al. |

FOREIGN PATENT DOCUMENTS

| | | |
|---|---|---|
| CN | 102714544 A | 10/2012 |
| WO | 1790948 A | 6/2006 |
| WO | 2010139355 A1 | 12/2010 |

\* cited by examiner

100

```
                                          S110
   ┌─────────────────────────────────┐
   │   Obtain spectrum of an optical │
   │        signal of interest       │
   └─────────────────────────────────┘
                     │
                     ▼                    S120
   ┌─────────────────────────────────┐
   │       Obtain spectrum of a      │
   │        comparative signal       │
   └─────────────────────────────────┘
                     │
                     ▼                    S130
   ┌─────────────────────────────────┐
   │  Calculate total powers Pi and Pc of the │
   │ signal of interest and the comparative signal │
   └─────────────────────────────────┘
                     │
                     ▼                    S140
   ┌─────────────────────────────────┐
   │  Calculate OSNR of the signal of interest  │
   │ based on the spectrums and the total powers│
   │   Pi and Pc of the signal of interest and the │
   │           comparative signal               │
   └─────────────────────────────────┘
```

METHOD AND DEVICE FOR MEASURING OPTICAL SIGNAL-TO-NOISE RATIO

CROSS-REFERENCE TO RELATED APPLICATIONS

The present application is a continuation-in-part of U.S. patent application Ser. No. 14/780,378, filed Sep. 25, 2015, which application is a national phase entry under 35 U.S.C. § 271 of International Application No. PCT/CN2013/084670 filed Sep. 30, 2013, which claims priority from Chinese Application No. 201310098130.9 filed Mar. 26, 2013, all of which are hereby incorporated herein by reference.

TECHNICAL FIELD

Embodiments of the present invention generally relate to the field of optical communication, and in particular, to methods and devices for measuring optical signal-to-noise ratio (OSNR), which are applicable in a wavelength divided multiplexer (WDM) system for online measurement of an in-band OSNR.

TECHNICAL BACKGROUND

Optical signal-to-noise ratio (OSNR), as a critical performance index for an optical communication network, is directly associated with bit error rate of an optical signal. A major source of optical noise in an optical transmission line is Amplified Spontaneous Emission (ASE) of an optical amplifier.

The IEC 61280-2-9 standard provides a standard method for determining OSNR in a Dense Wavelength Division Multiplexing (DWDM) system. This method measures a power level of the noise outside the signal bandwidth and interpolates the power level of the inter-band noise to evaluate a power level of the in-band noise in the signal bandwidth. However, this method does not work well in the following two situations. In a first situation, the signal has an inter-band noise and an in-band noise different from each other. For example, when the signal is filtered through such as Reconfigurable Optical Add-Drop Multiplexer (ROADM), the inter-band noise level would be very different from the in-band noise level. In a second situation, the optical signal has a signal spectrum and an inter-band noise spectrum overlapping with each other. For example, the optical signal with a high frequency of 40G/100G has a wideband signal spectrum that overlaps with the inter-band noise spectrum.

A conventional method for in-band OSNR measurement is called as "turning-off", in which the signal of the channel is turned off to measure the noise in the channel, thereby obtaining the in-band OSNR. Obviously, this method cannot accomplish online measurement of the in-band ONSR. The existing online in-band OSNR measuring methods are mostly based on an assumption that the polarization of the signal differs from the polarization of the noise in the channel. For example, the inherent channel noise is generally non-polarized, while the signal is highly polarized. The US patent application publication US2010/0129074A1 entitled "IN-BAND OPTICAL SIGNAL TO NOISE RATIO DETERMINATION METHOD AND SYSTEM" discloses an online in-band OSNR measuring method which is based on an assumption that the signal light is single polarized light and the noise light is non-polarized light. This method is not applicable for a polarization-multiplexed signal. The US patent application publication US2012/0106951A1 entitled "IN-BAND OPTICAL-TO-NOISE RATIO MEASUREMENT" also discloses an online in-band OSNR measuring method, which requires the signal has periodical power modulation. So, this method is not suitable for an arbitrary signal either.

Therefore, the existing on-line in-band OSNR measuring methods cannot realize a quick and accurate measurement on an arbitrary signal including a polarization-multiplexed signal.

SUMMARY OF INVENTION

An embodiment of the present invention provides a method for measuring an optical signal-to-noise ratio (OSNR) of a signal of interest comprising: obtaining spectrum of the signal of interest, the spectrum including power spectrum density distribution of the signal of interest in a channel bandwidth B; obtaining spectrum of a comparative signal that has the same spectrum characteristics as but different OSNR than the signal of interest, the spectrum including power spectrum density distribution of the comparative signal in the channel bandwidth B; and calculating the OSNR of the signal of interest by using the spectrum of the signal of interest and the spectrum of a comparative signal.

Another embodiment of the present invention provides a device for measuring an optical signal-to-noise ratio (OSNR), comprising: a splitter to split an optical input signal into a first optical signal and a second optical signal; a processing device to process the second optical signal so that the second optical signal has the same spectrum characteristics as but different OSNR than the first optical signal; an optical spectrum analyzer to measure spectrums of the first and second optical signals, the spectrums include power spectrum density distribution of the first and second optical signals in a channel bandwidth B; an optical switch to selectively pass one of the first and second optical signals to the optical spectrum analyzer; and a controller to control operations of the optical spectrum analyzer and the optical switch, wherein the controller is also configured to calculate the OSNR of the first optical signal based on the spectrums of the first and second optical signals.

Yet another embodiment of the present invention provides a dense wavelength division multiplexing system, which comprises the device for measuring an optical signal-to-noise ratio (OSNR) as described above.

In the present invention, the comparative signal which has the same spectrum characteristics as but different OSNR than the signal of interest is provided and measured so as to calculate the OSNR of the signal of interest. By doing so, the present invention can accomplish fast online OSNR measurement of the signal of interest without addition of any devices such as a polarization control device or a modulation device. The present invention may be applied to an arbitrary signal having any frequency, modulation format, single or multiple polarization, and it has no influence on the signal under measurement. The device for measuring an optical signal-to-noise ratio (OSNR) according to the present invention has a simple configuration, and it may be implemented as an optical performance monitoring module in an optical communication system having a frequency of 40G or higher.

EMBODIMENTS

Further description will be made in connection with the drawings and embodiments.

An embodiment of the present invention provides an OSNR measuring method, which can be carried out to implement on-line OSNR measurement on a signal having any frequency, modulation format, single or multiple polarizations, without additional signal modulation. This method has no influence on the signal under measurement in the optical transmission line.

Figure 1:
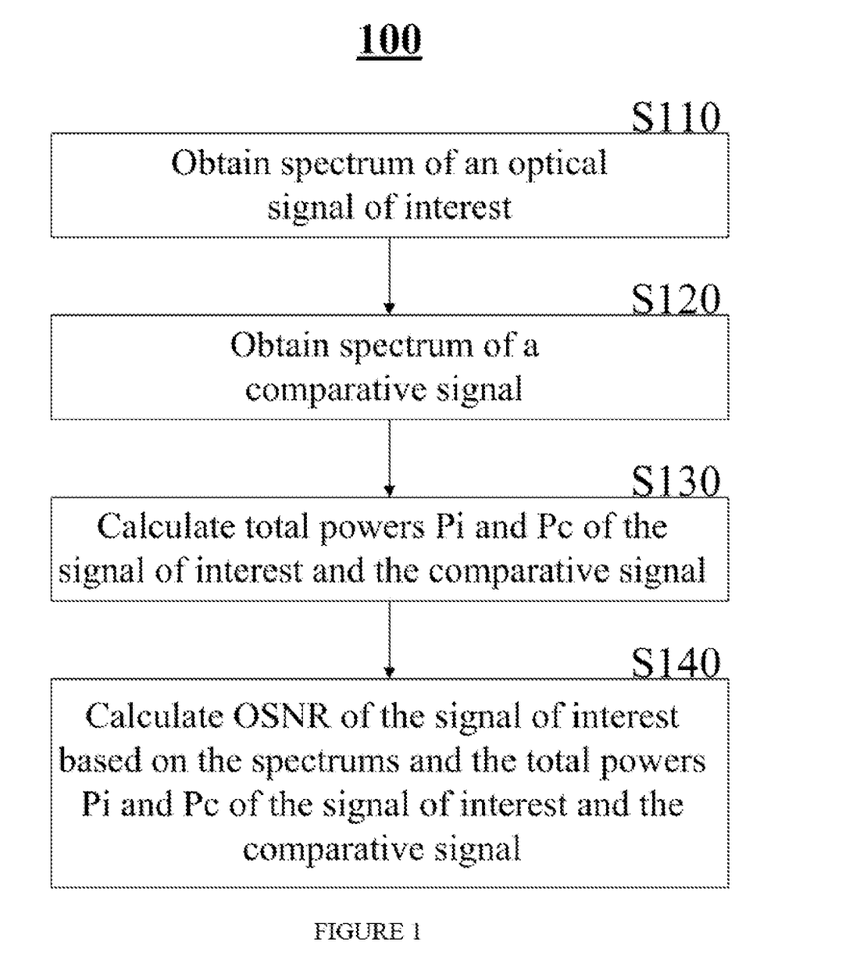
FIG. 1 is a flow chart showing a method for measuring OSNR in accordance with an embodiment of the present invention.
Figure 2:
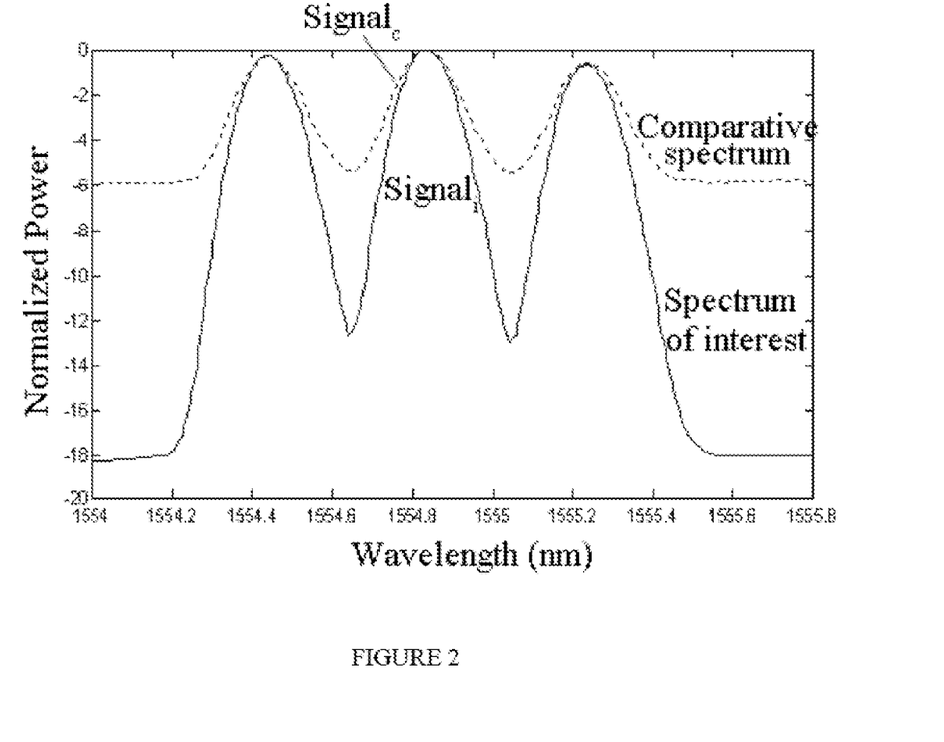
FIG. 2 is a graph showing spectrums of an exemplary signal of interest and an exemplary comparative signal.

FIG. 1 is a flow chart showing a method 100 for measuring OSNR in accordance with an embodiment of the present invention. As shown in FIG. 1, the method 100 may include a step S110 of obtaining spectrum of an optical signal of interest. The spectrum of the optical signal of interest may be obtained through, for example, an optical spectrum analyzer (OSA). In a case where the method of this embodiment is used in a DWDM system, a DWDM optical signal in the optical transmission line may be directed through a splitter into the optical spectrum analyzer for spectrum measurement, thereby obtaining spectrum of the DWDM optical signal. As known, the DWDM signal may include a plurality of signals with different wavelengths, for example, 2-160 signals of different wavelengths. FIG. 2 shows an example spectrum of a DWDM signal which includes three signals of different wavelengths. For the sake of description, the second signal Signali shown in FIG. 2 will be taken as an example of the signal of interest in the following description. Referring to FIG. 2, the signal of interest Signali may have a channel width B.

The OSNR measuring method 100 may further include a step 120 of obtaining spectrum of a comparative signal. The comparative signal is a signal having the same spectrum characteristics as but different OSNR than the signal of interest. The comparative signal may be obtained by one of a plurality of ways. For example, the comparative signal may be also a DWDM signal obtained from a different point in the same optical transmission line as the signal of interest, e.g., a point close to the signal transmitting end, a point close to the signal receiving end, or an point between the signal transmitting end and the signal receiving end. Alternatively, the comparative signal may be obtained by processing, for example, amplifying the signal of interest so as to change its OSNR. In another example, the comparative signal may be obtained from another optical transmission line in which an optical signal is generated using the same light source, e.g., a laser, and has the same modulation format as the signal of interest. When the spectrum of the comparative signal is measured at a location far away from the location where the spectrum of the signal of interest is measured, the spectrum of the comparative signal may be send through the network to the location where the spectrum of the signal of interest is measured for subsequent processing as described below. FIG. 2 also shows an exemplary spectrum of the comparative signal. As shown in FIG. 2, a comparative DWDM signal includes three signals of different wavelengths. For the sake of description, the second signal Signalc will be taken as an example of the comparative signal in the following description. Since the comparative signal Signalc has the same spectrum characteristics as the signal of interest Signali, they both have the same channel width B.

Next in a step S130, a total power Pi of the signal of interest and a total power Pc of the comparative signal may be calculated using the spectrums of the signal of interest and the comparative signal, respectively. In detail, the total power Pi of the signal of interest may be obtained by calculating an integral of the spectrum of the signal of interest within a range of the channel width B, and the total power Pc of the comparative signal may be obtained by calculating an integral of the spectrum of the comparative signal within the range of the channel width B. The obtained total powers Pi and Pc each include both a signal power and a noise power, and they can be represented by the following equations 1 and 2, $$P_i = \int_B p_i(\lambda)d\lambda = S_i + N_i \qquad (1)$$

$$P_c = \int_B p_c(\lambda)d\lambda = S_c + N_c \qquad (2)$$

wherein $\lambda$, is the wavelength, $p_i(\lambda)$ and $p_c(\lambda)$ are power of the signal of interest and the comparative signal at the wavelength $\lambda$, respectively, $S_i$ and $N_i$ are the signal power and the noise power of the signal of interest, respectively, and $S_c$ and $N_c$ are the signal power and the noise power of the comparative signal, respectively.

Next in a step S140, an OSNR of the signal of interest is calculated on the basis of the the spectrums and the total powers Pi and Pc of the signal of interest and the comparative signal.

First, a noise index F and a signal ratio factor A may be defined as in the following equations 3 and 4, respectively:

$$F = \frac{S_i/N_i}{S_c/N_c} \qquad (3)$$

$$A = \frac{S_c}{S_i} \qquad (4)$$

With the noise index F and the signal ratio factor A, the above equation 2 may be re-written as the following equation 5:

$$P_c = A \cdot S_i + F \cdot A \cdot N_i \qquad (5)$$

From the equations 1 and 5, the noise power of the signal of interest may be calculated as represented by the following equation 6:

$$N_i = \frac{1}{1-F}\left(P_i - \frac{P_c}{A}\right) \qquad (6)$$

Then, the optical signal-to-noise ratio $OSNR_i$ of the signal of interest may be obtained as represented by the following equation 7:

$$OSNR_i = 10\log_{10}\left(\frac{P_i - N_i}{N_i \cdot B_r/B}\right) \qquad (7)$$

wherein $B_r$ is the integral width of the noise, which is usually a constant as defined in some standards, for example, 0.1 nm.

It can be seen from the above equations that if the noise index F and the signal ratio factor A are calculated, then the optical signal-to-noise ratio $OSNR_i$ of the signal of interest may be obtained. The process of calculating the noise index F and the signal ratio factor A will be described in detail below.

In some cases, the OSNR of the comparative signal may be much smaller than that of the signal of interest. For example, when the comparative signal is measured at a point of the optical signal transmission line along which the signal of interest travels close to the signal receiving end or at a point of the optical signal transmission line much closer to the signal receiving end than the signal of interest does, or the comparative signal is obtained by processing the signal of interest to deteriorate its signal-to-noise ratio, or the comparative signal is a signal obtained from another optical signal transmission line different from that of the signal of interest and having the same spectrum characteristics as but much smaller signal-to-noise ratio than the signal of interest, the OSNR of the comparative signal is much smaller than that of the signal of interest. In such cases, the noise index F and the signal ratio factor A may be calculated as follows.

First, a first integral bandwidth BW1 may be selected within the channel wavelength range B where the signal power to noise power ratio is relatively large, and integrals of the signal of interest and the comparative signal are calculated respectively in the first integral bandwidth BW1, obtaining the integral power PiBW1 of the signal of interest and the integral power PcBW1 of the comparative signal. In an example, the first integral bandwidth BW1 may be selected at a position of the spectrums of the signal of interest and the comparative signal where the signal power to noise power ratio is the largest. That is, the first integral bandwidth BW1 may be centered at the signal peak wavelength and have a bandwidth of, e.g., 20pm. In addition, a second integral bandwidth BW2 may be selected within the channel wavelength range B where the signal power to noise power ratio is relatively small, and integrals of the signal of interest and the comparative signal are calculated respectively in the second integral bandwidth BW2, obtaining the integral power PiBW2 of the signal of interest and the integral power PcBW2 of the comparative signal. In an example, the second integral bandwidth BW2 may be selected at a position of the spectrums of the signal of interest and the comparative signal at either side of the signal peak wavelength. For example, the second integral bandwidth BW2 may be selected at a position with a distance of about 60pm from the signal peak wavelength in a shorter or longer wavelength direction and have a bandwidth of, e.g., 20pm. Then, a first ratio factor k1=PiBW1/PiBW2 and a second ratio factor k2=PcBW1/PcBW2 may be calculated based on the integral powers PiBW1, PcBW1, PiBW2 and PcBW2.

In addition, a third ratio factor k3=ScBW1/NcBW1 and a fourth ratio factor k4=ScBW2/NcBW2 may be defined, where ScBW1 and NcBW1 are the signal power and the noise power of the comparative signal in the first integral bandwidth BW1, and ScBW2 and NcBW2 are the signal power and the noise power of the comparative signal in the second integral bandwidth BW2.

Here, it assumes that the average noise power density distribution is approximately equal in the first integral bandwidth BW1 to in the second integral bandwidth BW2. Then, the following equation 8 may be obtained:

$$\frac{N^c_{BW1}}{N^c_{BW2}} = \frac{N^i_{BW1}}{N^i_{BW2}} = \frac{BW1}{BW2} \quad (8)$$

Using the equation 8, the first ratio factor k1 may be re-written as the following equation 9:

$$k1 = \frac{P^i_{BW1}}{P^i_{BW2}} = \frac{S^i_{BW1} + N^i_{BW1}}{S^i_{BW2} + N^i_{BW2}} = \frac{\frac{S^i_{BW1}}{N^i_{BW1}} \cdot BW1 + BW1}{\frac{S^i_{BW2}}{N^i_{BW2}} \cdot BW2 + BW2} \quad (9)$$

According to definition of the noise index F, we may obtain the following equation 10:

$$F = \frac{S^i_{BW1}/N^i_{BW1}}{S^c_{BW1}/N^c_{BW1}} = \frac{S^i_{BW2}/N^i_{BW2}}{S^c_{BW2}/N^c_{BW2}} \quad (10)$$

Then, the first ratio factor k1 and the second ratio factor k2 may be represented as in the following equations 11 and 12, respectively:

$$k1 = \frac{k3 \cdot F \cdot BW1 + BW1}{k4 \cdot F \cdot BW2 + BW2} \quad (11)$$

$$k2 = \frac{k3 \cdot BW1 + BW1}{k4 \cdot BW2 + BW2} \quad (12)$$

With the equations 11 and 12, the noise index F may be represented as in the following equation 13:

$$F = k2 \cdot (BW1 - BW2 \cdot k1)/(BW1 \cdot k1 - BW2 \cdot k1 \cdot k2 + BW1 \cdot k1 \cdot k3 \cdot BW1 \cdot k2 \cdot k3) \quad (13)$$

As mentioned above, the signal power to noise power ration is relatively large in the first integral bandwidth BW1, the noise power $N^i_{BW1}$ of the signal of interest in the first integral bandwidth BW1 and the noise power $N^c_{BW1}$ of the comparative signal in the first integral bandwidth BW1 both are very small, approximately zero. So, an initial signal ratio factor A may be obtained as follows:

$$A = P^c_{BW1}/P^i_{BW1} \quad (14)$$

In the second integral bandwidth BW2, however, the single-to-noise ratio of the signal of interest is much higher than that of the comparative signal. So, the noise power $N^c_{BW2}$ of the comparative signal in the second integral bandwidth BW2 may be calculated as follows:

$$N^c_{BW2} = P^c_{BW2} - A \cdot P^i_{BW2} \quad (15)$$

Accordingly, the noise power $N^c_{BW1}$ of the comparative signal in the first integral bandwidth BW1 may be calculated as follows:

$$N^c_{BW1} = N^c_{BW2} \cdot BW1/BW2 \quad (16)$$

With the noise power $N^c_{BW1}$ of the comparative signal in the first integral bandwidth BW1, the signal ratio factor A may be calculated again as:

$$A = (P^c_{BW1} - N^c_{BW1})/P^i_{BW1} \quad (17)$$

The above equations 15, 16 and 17 may be calculated repeatedly and iteratively until a convergent solution of the noise power NcBW1 of the comparative signal in the first integral bandwidth BW1 and a convergent solution of the signal ratio factor A are obtained. With the convergent solution of the noise power NcBW1, the third ratio factor k3=(PcBW1−NcBW1)/NcBW1 may be calculated, and thus the noise index F may be calculated according to the equation 13.

With the above calculated values of the noise index F and the signal ratio factor A, the optical signal-to-noise ratio OSNRi of the signal of interest may be calculated according to the equations 6 and 7. Taking the signal Signali shown in FIG. 2 as an example of the signal of interest and setting the noise integral bandwidth Br to 0.1 nm, the OSNR of the signal Signali may be calculated through the above process as 22.3 dB. The actual OSNR of the signal Signali obtained through a standard method is 21.7 dB. The difference between the OSNR obtained through the above embodiment and the OSNR obtained through the standard method is only 0.5 dB.

In some other cases, the OSNR of the comparative signal may be much higher than that of the signal of interest. For example, when the comparative signal is measured at a point of the optical signal transmission line along which the signal of interest travels close to the signal transmitting end or at a point of the optical signal transmission line much closer to the signal transmitting end than the signal of interest does, or the comparative signal is obtained by processing the signal of interest to improve its signal-to-noise ratio, or the comparative signal is a signal obtained from another optical signal transmission line different from that of the signal of interest and having the same spectrum characteristics as but much higher signal-to-noise ratio than the signal of interest, the OSNR of the comparative signal is much higher than that of the signal of interest. In such cases, the noise index F is very small, approximately zero, and thus the equation 6 may be re-written as the following equation 18:

$$N_i = P_i - \frac{P_c}{A} \qquad (18)$$

Then, within the first integral bandwidth BW1, e.g., a bandwidth of 20 pm at the peak wavelength, integrals of the signal of interest and the comparative signal are calculated, obtaining integral powers $P_{BW1}^i$, $P_{BW1}^c$ of the signal of interest and the comparative signal in the first integral bandwidth BW1, respectively. Since both the signal of interest and the comparative signal have a signal power much higher than a noise power in the first integral bandwidth BW1, the noise power may approximate to zero, and the signal ratio factor A may be initially calculated as follows:

$$A = P_{BW1}^c / P_{BW1}^i \qquad (19)$$

Substituting the initial value of the signal ratio factor A into the equation 18, the noise power of the signal of interest Ni may be calculated.

In the first integral bandwidth BW1, the signal ratio factor A may be represented as follows:

$$A = \frac{P_{BW1}^c}{P_{BW1}^i - N_i \cdot BW1/B} \qquad (20)$$

With the above calculated value of the noise power $N_i$, the signal ratio factor A may be calculated according to the equation 20, and then the calculated value of the signal ratio factor A may be used to calculate the noise power Ni according to the equation 18 again. As such, the equations 18 and 20 may be calculated repeatedly and iteratively until a convergent value of the signal ratio factor A and a convergent value of the noise power $N_i$ of the signal of interest are obtained. Substituting the convergent value of the noise power $N_i$ into the equation 7, the $OSNR_i$ of the signal of interest may be calculated.

In some other cases, the optical signal-to-noise ratio $OSNR_c$ of the comparative signal may be already known. For example, when the comparative signal is obtained from a different optical transmission line than the signal of interest, the OSNRc of the comparative signal may be measured by some methods such as the turning-off method. Alternatively, if the comparative signal is obtained from the same optical transmission line as the signal of interest, the OSNRc of the comparative signal may be measured by some existing online OSNR measuring methods. In such cases, the noise index F may be represented as the following equation 21:

$$F=(P_i-N_i)/(N_i \cdot OSNR_c) \qquad (21)$$

wherein $OSNR_c$ has a linear value, not a logarithmic value as in the equation 7.

Substituting the equation 21 into the equation 6, the following equation 22 may be obtained:

$$N_i = P_i - \frac{P_c OSNR_c}{A(1 + OSNR_c)} \qquad (22)$$

Also, the signal ratio factor A and the noise power Ni of the signal of interest may be calculated by an iterative process. In detail, in the first integral bandwidth BW1, the signal ratio factor A may be represented as follows:

$$A = \frac{P_{BW1}^c(1 - 1/OSNR_c)}{P_{BW1}^i - N_i \cdot BW1/B} \qquad (23)$$

Since the noise power $N_i$ of the signal of interest is very small in the first integral bandwidth BW1, approximately zero, the signal ratio factor A may be deemed to have an initial value:

$$A = \frac{P_{BW1}^c(1 - 1/OSNR_c)}{P_{BW1}^i} \qquad (24)$$

Substituting the initial value of the signal ratio factor A into the equation 22, the noise power $N_i$ of the signal of interest may be calculated. The noise power Ni may be used to calculate the signal ratio factor A according to the equation 23. Then, calculations of the noise power Ni and the signal ratio factor A may be performed repeatedly and iteratively until a convergent value of the signal ratio factor A and a convergent value of the noise power $N_i$ are obtained. Substituting the convergent value of the noise power $N_i$ into the equation 7, the $OSNR_i$ of the signal of interest may be calculated.

Although the above description gives some specific examples of the first integral bandwidth BW1 and the second integral bandwidth BW2, the present invention is not limited thereto. Instead, the first integral bandwidth BW1 and the second integral bandwidth BW2 each may have a position and a range selected in accordance with wave shape of the spectrums of the signal of interest and the comparative signal.

In the above embodiments of the OSNR measuring methods, the comparative signal that has the same spectrum characteristics as but different OSNR than the signal of interest is provided and measured, thereby accomplishing online OSNR measurement of the signal of interest. The method may be applicable on an arbitrary signal having any frequency, modulation format, single or multiple polarizations, and it has no influence on the signal under measurement.

Figure 3:
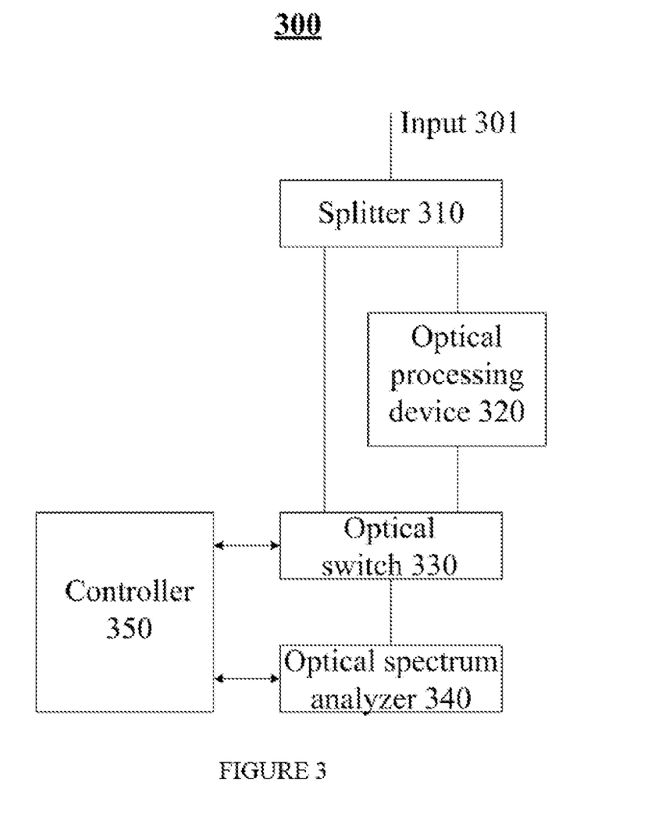
FIG. 3 is a block diagram showing an OSNR measurement device in accordance with an embodiment of the present invention.

FIG. 3 is a block diagram showing an OSNR measurement device 300 in accordance with an embodiment of the present invention. Referring to FIG. 3, the OSNR measurement device 300 includes an input end 301 to receive an optical input signal Signali from, for example, a DWDM system. The input signal Signali passes through a splitter 310 and becomes two beams, one of which is directly provided to an optical switch 330 as a signal of interest Signali, and the other is processed in an optical processing device 320 and then provided to the optical switch 330 as a comparative signal Signalc. The optical processing device 320 may process the input signal Signali to change its signal-to-noise ratio so that the input signal Signali becomes the comparative signal Signalc having the same spectrum as but different signal-to-noise ratio than the input signal Signali. For example, the optical processing device 320 may be an optical amplifier such as an erbium doped fiber amplifier to amplify the input signal Signali so that the signal-to-noise ratio of the input signal Signali deteriorates. In another example, the optical processing device 320 may be an optical device to improve the signal-to-noise ratio of the input signal Signali.

The optical switch 330 may be a 2*1 MEMS (Micro-Electro-Mechanical System) optical switch, which provides one of the signal of interest Signali and the comparative signal Signalc to an optical spectrum analyzer 340 where the spectrums of the signal of interest Signali and the comparative signal Signalc are measured. The optical switch 330 and the optical spectrum analyzer 340 may be controlled by a control device 350 to perform spectrum measurement of the signal of interest Signali and the comparative signal Signalc. In addition, the control device 350 is also configured to perform the calculation process as described above based on the measured spectrums, thereby obtaining the OSNRi of the signal of interest Signali. Since the calculation process has been discussed in detail, the description thereof would not be repeated here.

An embodiment of the present invention also provides a DWDM system, which may include the OSNR measurement device 300 as an optical performance monitoring (OPM) module. With the OSNR measurement device 300 included, the DWDM system may monitor its optical performance without interrupting optical communication thereon.

While certain embodiments have been described, these embodiments have been presented by way of example only, and are not intended to limit the scope of the present invention. For example, parameters and order of actions may be adjusted according to actual need. It should be appreciated that those skilled in the art can make some changes or modifications in form or detail, and such changes and modifications shall fall within the scope of the present invention as defined in the claims and the equivalents.

The invention claimed is:

1. A method for measuring an optical signal-to-noise ratio (OSNR) of a signal of interest, comprising:
   measuring, by an optical spectrum analyzer, spectrum of the signal of interest, the spectrum including power spectrum density distribution of the signal of interest in a channel bandwidth B;
   measuring, by the optical spectrum analyzer, spectrum of a comparative signal that has the same spectrum characteristics as but different OSNR than the signal of interest, the spectrum including power spectrum density distribution of the comparative signal in the channel bandwidth B; and
   calculating, by a controller in communication with the optical spectrum analyzer, the OSNR of the signal of interest by using both the spectrum of the signal of interest and the spectrum of the comparative signal.

2. The method of claim 1 wherein the signal of interest and the comparative signal are obtained from different points in the same optical transmission line.

3. The method of claim 1 wherein the comparative signal is an optical signal obtained by processing the signal of interest to change its OSNR.

4. The method of claim 1 wherein the comparative signal is an optical signal obtained from an optical transmission line different from that of the signal of interest, generated from the same light source as the signal of interest, and having the same modulation format as the signal of interest.

5. The method of claim 1 wherein the step of calculating the OSNR of the signal of interest comprises:
   calculating integrals of the spectrums of the signal of interest and the comparative signal in the channel bandwidth B to obtain a total power $P_i$ of the signal of interest and a total power $P_c$ of the comparative signal, respectively;
   calculating integrals of the spectrums of the signal of interest and the comparative signal in a first integral bandwidth BW1 within the channel bandwidth B to obtain a power $P_{BW1}^i$ of the signal of interest in the first integral bandwidth BW1 and a power $P_{BW1}^c$ of the comparative signal in the first integral bandwidth BW1, respectively; and
   calculating the OSNR of the signal of interest by using the power values $P_i$, $P_c$, $P_{BW1}^i$ and $P_{BW1}^c$.

6. The method of claim 5 wherein the first integral bandwidth BW1 is a range in the channel bandwidth B where a ratio of signal power to noise power is relatively large.

7. The method of claim 6 wherein the first integral bandwidth BW1 is a range in the channel bandwidth B that is positioned at a peak wavelength of the signal of interest and the comparative signal.

8. The method of claim 5 wherein the step of calculating the OSNR of the signal of interest by using the power values $P_i$, $P_c$, $P_{BW1}^i$ and $P_{BW1}^c$ comprises:
   when the comparative signal has an OSNR much higher than that of the signal of interest, iteratively calculating the following equations 18 and 20 with an initial value $P_{BW1}^c/P_{BW1}^i$ for a parameter A until a convergent value for a parameter Ni is obtained, and
   calculating the OSNR of the signal of interest using the convergent value for the parameter Ni according to the following equation 7, $$N_i = P_i - \frac{P_c}{A}, \quad (18)$$

$$A = \frac{P_{BW1}^c}{P_{BW1}^c - N_i \cdot BW1/B}, \quad (20)$$

$$OSNR_i = 10\log_{10}\left(\frac{P_i - N_i}{N_i \cdot B_r/B}\right), \quad (7)$$

wherein $OSNR_i$ is the OSNR of the signal of interest, and $B_r$ is an integral bandwidth for the noise.

9. The method of claim 5 wherein the step of calculating the OSNR of the signal of interest by using the power values $P_i$, $P_c$, $P_{BW1}^i$ and $P_{BW1}^c$ comprises:

when the OSNR of the comparative signal is already known, iteratively calculating the following equations 22 and 23 with an initial value $P_{BW1}^c(1-1/OSNR_c)/P_{BW1}^i$ for a parameter A until a convergent value for a parameter Ni is obtained, and calculating the OSNR of the signal of interest using the convergent value for the parameter Ni according to the following equation 7, $$N_i = P_i - \frac{P_c OSNR_c}{A(1 + OSNR_c)}, \quad (22)$$

$$A = \frac{P_{BW1}^c(1 - 1/OSNR_c)}{P_{BW1}^c - N_i \cdot BW1/B}, \quad (23)$$

$$OSNR_i = 10\log_{10}\left(\frac{P_i - N_i}{N_i \cdot B_r/B}\right), \quad (7)$$

wherein $OSNR_i$ is the OSNR of the signal of interest, $OSNR_c$ is the OSNR of the comparative signal, and $B_r$ is an integral bandwidth for the noise.

10. The method of claim 5 wherein the step of calculating the OSNR of the signal of interest by using the power values $P_i$, $P_c$, $P_{BW1}^i$ and $P_{BW1}^c$ comprises:

when the comparative signal has an OSNR much smaller than that of the signal of interest, calculating integrals of the spectrums of the signal of interest and the comparative signal in a second integral bandwidth BW2 within the channel bandwidth B to obtain a power $P_{BW2}^i$ of the signal of interest in the second integral bandwidth BW2 and a power $P_{BW2}^c$ of the comparative signal in the second integral bandwidth BW2, respectively;

iteratively calculating the following equations 15, 16 and 17 with an initial value $P_{BW1}^c/P_{BW1}^i$ for a parameter A until convergent values for parameters A and $N_{BW1}^c$ are obtained, and $$N_{BW2}^c = P_{BW2}^c - A \cdot P_{BW2}^i \quad (15),$$

$$N_{BW1}^c = N_{BW2}^c \cdot BW1/BW2 \quad (16),$$

$$A = (P_{BW1}^c - N_{BW1}^c)/P_{BW1}^i \quad (17),$$

calculating the OSNR of the signal of interest using the convergent values for the parameters A and $N_{BW1}^c$ according to the following equations 13, 6 and 7, $$F = k2 \cdot (BW1 - BW2 \cdot k1)/(BW1 \cdot k1 - BW2 \cdot k1 \cdot k2 + BW1 \cdot k1 \cdot k3 - BW1 \cdot k2 \cdot k3) \quad (13)$$

$$N_i = \frac{1}{1-F}\left(P_i - \frac{P_c}{A}\right), \quad (6)$$

$$OSNR_i = 10\log_{10}\left(\frac{P_i - N_i}{N_i \cdot B_r/B}\right), \quad (7)$$

wherein $OSNR_i$ is the OSNR of the signal of interest, $B_r$ is an integral bandwidth for the noise, $k1 = P_{BW1}^i/P_{BW2}^i$, $k2 = P_{BW1}^c/P_{BW2}^c$, and $k3 = (P_{BW1}^c - N_{BW1}^c)/N_{BW1}^c$.

11. The method of claim 10 wherein the second integral bandwidth BW2 is a range in the channel bandwidth B where a ratio of signal power to noise power is relatively small.

12. The method of claim 11 wherein the second integral bandwidth BW2 is a range in the channel bandwidth B which offsets from a peak wavelength of the signal of interest and the comparative signal in a longer or shorter wavelength direction.

13. A device for measuring an optical signal-to-noise ratio (OSNR), comprising:

a splitter to split an optical input signal into a first optical signal and a second optical signal;

a processor to process the second optical signal so that the second optical signal has the same spectrum characteristics as but different OSNR than the first optical signal;

an optical spectrum analyzer to measure spectrums of the first and second optical signals, the spectrums include power spectrum density distribution of the first and second optical signals in a channel bandwidth B; an optical switch to selectively pass one of the first and second optical signals to the optical spectrum analyzer; and a controller to control operations of the optical spectrum analyzer and the optical switch, wherein the controller is also configured to calculate the OSNR of the first optical signal based on both the spectrums of the first and second optical signals.

14. The device of claim 13 wherein the processor comprises an optical amplifier.

15. The device of claim 13 wherein the controller is also configured to calculate the OSNR of the first optical signal by the following steps:

calculating integrals of the spectrums of the first optical signal and the second optical signal in the channel bandwidth B to obtain a total power $P_i$ of the first optical signal and a total power $P_c$ of the second optical signal, respectively;

calculating integrals of the spectrums of the first optical signal and the second optical signal in a first integral bandwidth BW1 within the channel bandwidth B to obtain a power $P_{BW1}^i$ of the first optical signal in the first integral bandwidth BW1 and a power $P_{BW1}^c$ of the second optical signal in the first integral bandwidth BW1, respectively; and calculating the OSNR of the first optical signal by using the power values $P_i$, $P_c$, $P_{BW1}^i$ and $P_{BW1}^c$.

16. The device of claim 15 wherein the first integral bandwidth BW1 is a range in the channel bandwidth B where a ratio of signal power to noise power is relatively large.

17. The device of claim 15 wherein the controller is configured to calculate the OSNR of the first optical signal by the following steps when the second optical signal has an OSNR much higher than that of the first optical signal:

iteratively calculating the following equations 18 and 20 with an initial value $P_{BW1}^c/P_{BW1}^i$ for a parameter A until a convergent value for a parameter Ni is obtained, and calculating the OSNR of the first optical signal using the convergent value for the parameter Ni according to the following equation 7, $$N_i = P_i - \frac{P_c}{A}, \quad (18)$$

$$A = \frac{P_{BW1}^c}{P_{BW1}^i - N_i \cdot BW1/B}, \quad (20)$$

$$OSNR_i = 10\log_{10}\left(\frac{P_i - N_i}{N_i \cdot B_r/B}\right), \quad (7)$$

wherein $OSNR_i$ is the OSNR of the first optical signal, and $B_r$ is an integral bandwidth for the noise.

18. The device of claim 15 wherein the controller is configured to calculate the OSNR of the first optical signal by the following steps when the second optical signal has an OSNR much smaller than that of the first optical signal:

calculating integrals of the spectrums of the first optical signal and the second optical signal in a second integral bandwidth BW2 within the channel bandwidth B to obtain a power $P_{BW2}^i$ of the first optical signal in the second integral bandwidth BW2 and a power $P_{BW2}^c$ of the second optical signal in the second integral bandwidth BW2, respectively, iteratively calculating the following equations 15, 16 and 17 with an initial value $P_{BW1}^c/P_{BW1}^i$ for a parameter A until convergent values for parameters A and $N_{BW1}^c$ are obtained, and $$N_{BW2}^c = P_{BW2}^c - A \cdot P_{BW2}^i \quad (15),$$

$$N_{BW1}^c = N_{BW2}^c \cdot BW1/BW2 \quad (16),$$

$$A = (P_{BW1}^c - N_{BW1}^c)/P_{BW1}^i \quad (17),$$

calculating the OSNR of the first optical signal using the convergent values for the parameters A and $N_{BW1}^c$ according to the following equations 13, 6 and 7, $$F = k2 \cdot (BW1 - BW2 \cdot k1)/(BW1 \cdot k1 - BW2 \cdot k1 \cdot k2 + BW1 \cdot k1 \cdot k3 - BW1 \cdot k2 \cdot k3) \quad (13),$$

$$N_i = \frac{1}{1-F}\left(P_i - \frac{P_c}{A}\right), \quad (6)$$

$$OSNR_i = 10\log_{10}\left(\frac{P_i - N_i}{N_i \cdot B_r/B}\right), \quad (7)$$

wherein $OSNR_i$ is the OSNR of the signal of interest, $B_r$ is an integral bandwidth for the noise, $k1 = P_{BW1}^i/P_{BW2}^i$, $k2 = P_{BW1}^c/P_{BW2}^c$, and $k3 = (P_{BW1}^c - N_{BW1}^c)/N_{BW1}^c$.

19. The device of claim 18 wherein the second integral bandwidth BW2 is a range in the channel bandwidth B where a ratio of signal power to noise power is relatively small.

20. A dense wavelength division multiplexing system comprising the device for measuring an optical signal-to-noise ratio (OSNR) as recited in claim 13.

* * * * *